(12) United States Patent
Smyth et al.

(10) Patent No.: US 8,844,953 B2
(45) Date of Patent: Sep. 30, 2014

(54) MECHANICAL STEERING LINKAGE FOR BATTERY POWERED MOWER WITH ZERO TURNING RADIUS

(71) Applicant: Accelerated Systems Inc., Waterloo (CA)

(72) Inventors: Desmond Mark Robertson Smyth, Wellesley (CA); Stanley Arthur Baer, Kitchener (CA)

(73) Assignee: Accelerated Systems Inc., Waterloo, Ontario (CA)

( * ) Notice: Subject to any disclaimer, the term of this patent is extended or adjusted under 35 U.S.C. 154(b) by 79 days.

(21) Appl. No.: 13/631,166

(22) Filed: Sep. 28, 2012

(65) Prior Publication Data

US 2013/0264788 A1 Oct. 10, 2013

Related U.S. Application Data

(60) Provisional application No. 61/541,640, filed on Sep. 30, 2011.

(51) Int. Cl.
*B62D 7/16* (2006.01)

(52) U.S. Cl.
USPC .................................................... 280/93.51

(58) Field of Classification Search
CPC .............. B62D 7/10; B62D 7/16; B62D 7/20; B62D 3/12
USPC ......... 280/93.51, 93.511, 93.512, 93.514, 98; 180/428, 432
See application file for complete search history.

(56) References Cited

U.S. PATENT DOCUMENTS

| | | |
|---|---|---|
| 3,809,975 A | 5/1974 | Bartels |
| 4,070,671 A | 1/1978 | Morrow |
| 4,630,701 A | 12/1986 | Venetjoki |
| 4,656,559 A | 4/1987 | Fathi |
| D296,323 S | 6/1988 | McCarthy |
| 4,790,399 A | 12/1988 | Middlesworth |
| 4,807,904 A | 2/1989 | Kamlukin et al. |
| 4,845,590 A | 7/1989 | Mikolajczak |
| 4,865,146 A | 9/1989 | Ohe |
| 4,886,291 A | 12/1989 | Okamoto |
| 5,032,996 A | 7/1991 | Shiraishi |
| 5,099,714 A | 3/1992 | Hutchison et al. |

(Continued)

FOREIGN PATENT DOCUMENTS

| | | |
|---|---|---|
| WO | 2013059914 A1 | 5/2013 |
| WO | 2013059915 A1 | 5/2013 |
| WO | 2013059917 A1 | 5/2013 |

*Primary Examiner* — Faye M. Fleming
(74) *Attorney, Agent, or Firm* — Bereskin & Parr LLP (57) ABSTRACT

A steering system for a riding lawn mower includes a wheel frame pivotally coupled to a vehicle frame about a roll axis. The wheel frame has spaced apart upper and lower wheel frame members. Steering knuckles are pivotally coupled to opposing sides of the wheel frame for rotatably supporting wheels. Each steering knuckle is straddle mounted between the upper and lower wheel frame members. A rack and pinion steering mechanism for pivoting the steering knuckles is coupled to a steering wheel via a steering column. The steering column includes a shaft portion extending along a shaft axis and has at least one socketed connection. The socketed connection transmits rotational movement about the shaft axis between the shaft portion and another rotatable component. The socketed connection also permits axial movement of the shaft portion along the shaft axis in response to the wheel frame rolling relative to the vehicle frame.

20 Claims, 7 Drawing Sheets

(56) References Cited

U.S. PATENT DOCUMENTS

| | | | |
|---|---|---|---|
| 5,194,851 A | 3/1993 | Kraning et al. | |
| 5,218,366 A | 6/1993 | Cardamone et al. | |
| 5,282,135 A | 1/1994 | Sato et al. | |
| 5,283,740 A | 2/1994 | Sato et al. | |
| 5,311,957 A | 5/1994 | McLaurin et al. | |
| 5,321,582 A | 6/1994 | Casperson | |
| 5,348,502 A | 9/1994 | Wigram | |
| 5,450,284 A | 9/1995 | Wekell | |
| 5,461,542 A | 10/1995 | Kosak et al. | |
| 5,640,304 A | 6/1997 | Hellinga et al. | |
| 5,667,032 A | 9/1997 | Kamlukin | |
| 5,691,957 A | 11/1997 | Spiesberger | |
| 5,761,046 A | 6/1998 | Hein et al. | |
| 5,909,358 A | 6/1999 | Bradt | |
| 5,937,622 A | 8/1999 | Carrier et al. | |
| 5,988,936 A | 11/1999 | Smith | |
| 6,046,908 A | 4/2000 | Feng | |
| 6,078,501 A | 6/2000 | Catrambone et al. | |
| 6,185,920 B1 | 2/2001 | Oxley | |
| 6,456,925 B1 | 9/2002 | Romig | |
| 6,548,969 B2 | 4/2003 | Ewbank et al. | |
| 6,601,663 B2 | 8/2003 | Hauser | |
| 6,675,925 B2 | 1/2004 | Takahashi et al. | |
| 6,691,009 B1 | 2/2004 | Yao et al. | |
| 6,694,239 B1 | 2/2004 | Yao et al. | |
| 6,714,414 B1 | 3/2004 | Dubovsky et al. | |
| 6,721,639 B2 | 4/2004 | Raypole et al. | |
| 6,736,604 B2 | 5/2004 | Okada et al. | |
| 6,904,985 B2 | 6/2005 | Ferree et al. | |
| 6,948,299 B2 | 9/2005 | Osborne | |
| 7,075,458 B2 | 7/2006 | Dowdy | |
| 7,114,589 B2 | 10/2006 | Kowatari et al. | |
| 7,151,669 B2 | 12/2006 | Liu | |
| 7,190,589 B2 | 3/2007 | Caines et al. | |
| 7,192,040 B2 | 3/2007 | Xie | |
| 7,222,008 B2 | 5/2007 | Takahashi et al. | |
| 7,237,629 B1 | 7/2007 | Bland et al. | |
| 7,237,639 B2 | 7/2007 | Kowatari et al. | |
| 7,275,355 B2 | 10/2007 | Adams et al. | |
| 7,295,907 B2 | 11/2007 | Lu et al. | |
| 7,311,184 B2 | 12/2007 | Patridge | |
| 7,359,203 B2 | 4/2008 | Chen | |
| 7,448,466 B2 * | 11/2008 | Miller et al. | 180/444 |
| 7,487,856 B2 | 2/2009 | Edson et al. | |
| 7,549,243 B1 | 6/2009 | Gilles | |
| 7,594,377 B1 | 9/2009 | Jansen et al. | |
| 7,710,077 B2 | 5/2010 | Zeng et al. | |
| 7,735,845 B2 | 6/2010 | Snow | |
| 7,756,621 B2 | 7/2010 | Pillar et al. | |
| 7,791,888 B2 | 9/2010 | Tominaga et al. | |
| 7,800,395 B2 | 9/2010 | Johnson et al. | |
| 7,866,432 B2 | 1/2011 | Xie | |
| 8,287,323 B2 | 10/2012 | Hine et al. | |
| 8,376,790 B2 | 2/2013 | Hine et al. | |
| 8,620,527 B2 | 12/2013 | Stone et al. | |
| 2003/0070862 A1 | 4/2003 | Tartara | |
| 2006/0175098 A1 | 8/2006 | Sutherland | |
| 2007/0029748 A1 * | 2/2007 | Baxter et al. | 280/86.758 |
| 2007/0144796 A1 | 6/2007 | Schaedler et al. | |
| 2007/0147004 A1 | 6/2007 | Caines et al. | |
| 2008/0278314 A1 | 11/2008 | Miller et al. | |
| 2010/0045506 A1 | 2/2010 | Law et al. | |
| 2013/0110351 A1 | 5/2013 | Stone et al. | |
| 2013/0234410 A1 * | 9/2013 | Sumihara | 280/93.514 |
| 2013/0264788 A1 | 10/2013 | Smyth et al. | |

* cited by examiner

MECHANICAL STEERING LINKAGE FOR BATTERY POWERED MOWER WITH ZERO TURNING RADIUS

TECHNICAL FIELD

The embodiments herein relate to steering systems, and in particular to mechanical steering systems for riding lawn mowers having a zero turning radius.

BACKGROUND

Riding lawn mowers, riding snow blowers, riding lawn tractors, and other small vehicles often operate on ground surfaces such as grass or turf that are uneven. For example, uneven terrain may include side slopes, hills, bumps, and so on in a person's yard. To accommodate these features, some riding lawn mowers are adapted to keep the wheels in contact with the ground while travelling over uneven terrain. For example, some riding lawn mowers may include suspension systems that allow the wheels to move up or down in response to travel over uneven ground.

Riding lawn mowers also include steering systems for controlling vehicle movement. These systems may operate a set of steerable wheels, for example, the front wheels, rear wheels, or both the front and rear wheels. These steering systems generally include a steering wheel that allows an operator to turn the steering wheel and steer the riding lawn mower by pivoting the steerable wheels.

One difficulty with mechanically connecting the steering wheel to the steerable wheels is that the steering system might interfere with the ability of the riding lawn mower to travel over uneven terrain. For example, as the riding lawn mower travels over uneven terrain, the suspension system may pivot the steerable wheels, and thus lead to unintentional turns, wheel skidding, and other dynamic steering errors. Unintentional turning of the wheels can impede an operator's control over the vehicle. Furthermore, wheel skidding is undesirable for riding lawn mowers because it can scuff or otherwise damage lawns.

SUMMARY OF SOME EMBODIMENTS

According to some embodiments, there is provided a riding lawnmower that includes a vehicle frame extending along a longitudinal axis, left and right rear wheels for supporting a rear portion of the vehicle frame, left and right front wheels for supporting a front portion of the frame, and a steering system for steering the front wheels. The steering system includes a front wheel frame pivotally coupled to the vehicle frame about a longitudinally extending roll axis for permitting the front wheel frame to roll relative to the vehicle frame. The front wheel frame has spaced apart upper and lower wheel frame members. The steering system also includes left and right steering knuckles pivotally coupled to opposing sides of the front wheel frame for rotatably supporting the front wheels. Each steering knuckle is straddle mounted between the upper and lower wheel frame members and is adapted for pivotal movement about a respective steering axis. The steering system also includes a rack and pinion steering mechanism coupled to the left and right steering knuckles for pivoting the steering knuckles about each respective steering axis, a steering wheel for operating the rack and pinion steering mechanism, and a steering column for coupling the steering wheel to the rack and pinion steering mechanism. The steering column includes at least one shaft portion extending along a shaft axis. The shaft portion has at least one socketed connection. The socketed connection is adapted to provide engagement between the shaft portion and another rotatable component so as to transmit rotational movement about the shaft axis between the shaft portion and the rotatable component. The socketed connection is also adapted to permit axial movement of the shaft portion along the shaft axis in response to the front wheel frame rolling relative to the vehicle frame about the roll axis.

In some embodiments, the shaft portion may be a lower shaft portion extending along a lower shaft axis, and the rotatable component may be a pinion of the rack and pinion steering mechanism. The riding lawn mower might also include a lower shaft coupler for coupling the lower shaft portion to the pinion, and the lower shaft coupler might provide the socketed connected between the lower shaft portion and the pinion. In some embodiments, the lower shaft coupler might have an upper socket with a hexagonal cross-section configured to radially engage a corresponding hexagonal cross-section of the lower shaft portion.

In some embodiments, the riding lawn mower might include an upper shaft portion extending along an upper shaft axis inclined upwardly relative to the lower shaft axis, and an upper shaft coupler for coupling the upper shaft portion to the lower shaft portion. The upper shaft coupler might provide the socketed connected between the upper shaft portion and the lower shaft portion.

In some embodiments, the rack and pinion steering mechanism might include a rack supported between the upper and lower wheel frame members and a pinion coupled to the steering column. The rack extends between the left and right steering knuckles and is coupled thereto. The pinion is positioned to engage the rack such that rotational movement of the shaft portion about the shaft axis rotates the pinion so as to shift the rack back and forth and thereby pivot the steer knuckles.

In some embodiments, the front wheel frame might include a pivot member extending upward from the upper wheel frame member for pivotally coupling the wheel frame to the vehicle frame along the roll axis. The pivot member might have an aperture for receiving a corresponding pin so as to pivotally couple the front wheel frame to the vehicle frame about the roll axis.

In some embodiments, the at least one shaft portion might include an upper shaft portion coupled to the steering wheel, and a lower shaft portion for coupling the upper shaft to the rack and pinion steering mechanism. The upper shaft portion extends along an upper shaft axis, and the lower shaft portion extends along a lower shaft axis. Furthermore, the upper shaft axis might be inclined upwardly relative to the lower shaft axis. The steering system might also include a set of bevel gears for coupling the upper shaft portion to the lower shaft portion.

In some embodiments, the steering system might be adapted to provide a zero turning radius. For example, each steering knuckle might be sized and shaped to fit between the upper and lower members such that the steering knuckle can pivot freely therebetween so as to provide the zero turning radius.

In some embodiments, the opposing sides of the front wheel frame might extend transversely outward beyond the front portion of the vehicle frame by an overhang distance. In some embodiments, the overhang distance might be at least as large as about the radius of the front wheels.

In some embodiments, the riding lawn mower might include left and right link arms for coupling the rack and pinion steering mechanism to the steering knuckles.

According to some embodiments, there is provided a steering system for a vehicle. The steering system includes a wheel frame configured to be pivotally coupled to a vehicle frame about a longitudinally extending roll axis for permitting the wheel frame to roll relative to the vehicle frame. The wheel frame has spaced apart upper and lower wheel frame members. The steering system also includes left and right steering knuckles pivotally coupled to opposing sides of the wheel frame for rotatably supporting wheels. Each steering knuckle is straddle mounted between the upper and lower wheel frame members for pivotal movement about a respective steering axis. The steering mechanism also includes a steering mechanism coupled to the left and right steering knuckles for pivoting the steering knuckles about each respective steering axis, a steering wheel for operating the steering mechanism, and a steering column for coupling the steering wheel to the steering mechanism. The steering column includes at least one shaft portion extending along a shaft axis. The shaft portion has at least one socketed connection. The socketed connection is adapted to provide engagement between the shaft portion and another rotatable component so as to transmit rotational movement about the shaft axis therebetween. The socketed connection is also adapted to permit axial movement of the shaft portion along the shaft axis in response to the wheel frame rolling relative to the vehicle frame about the roll axis.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION OF VARIOUS EMBODIMENTS

Figure 1:
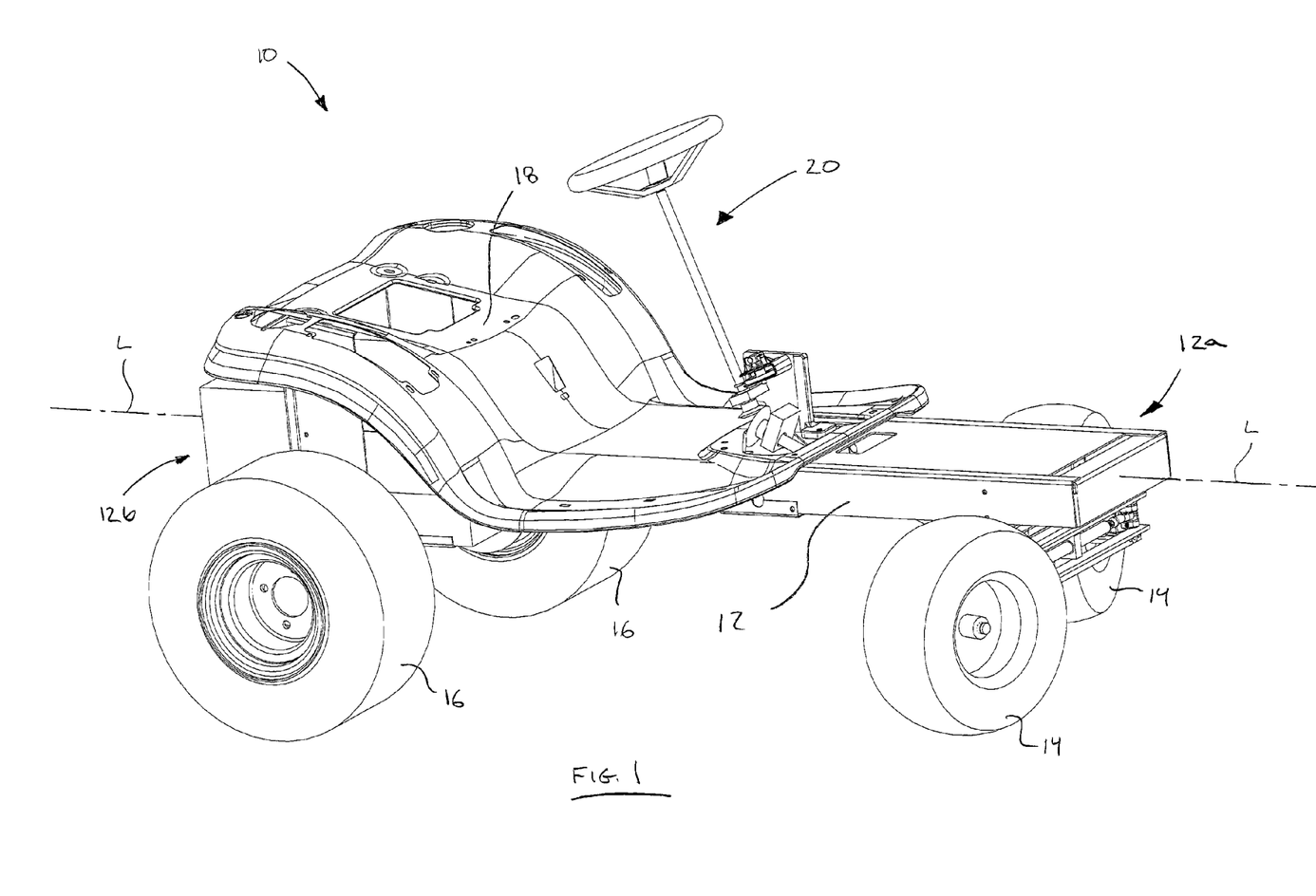
FIG. 1 is a perspective view of a riding lawn mower according to one embodiment.
Figure 2:
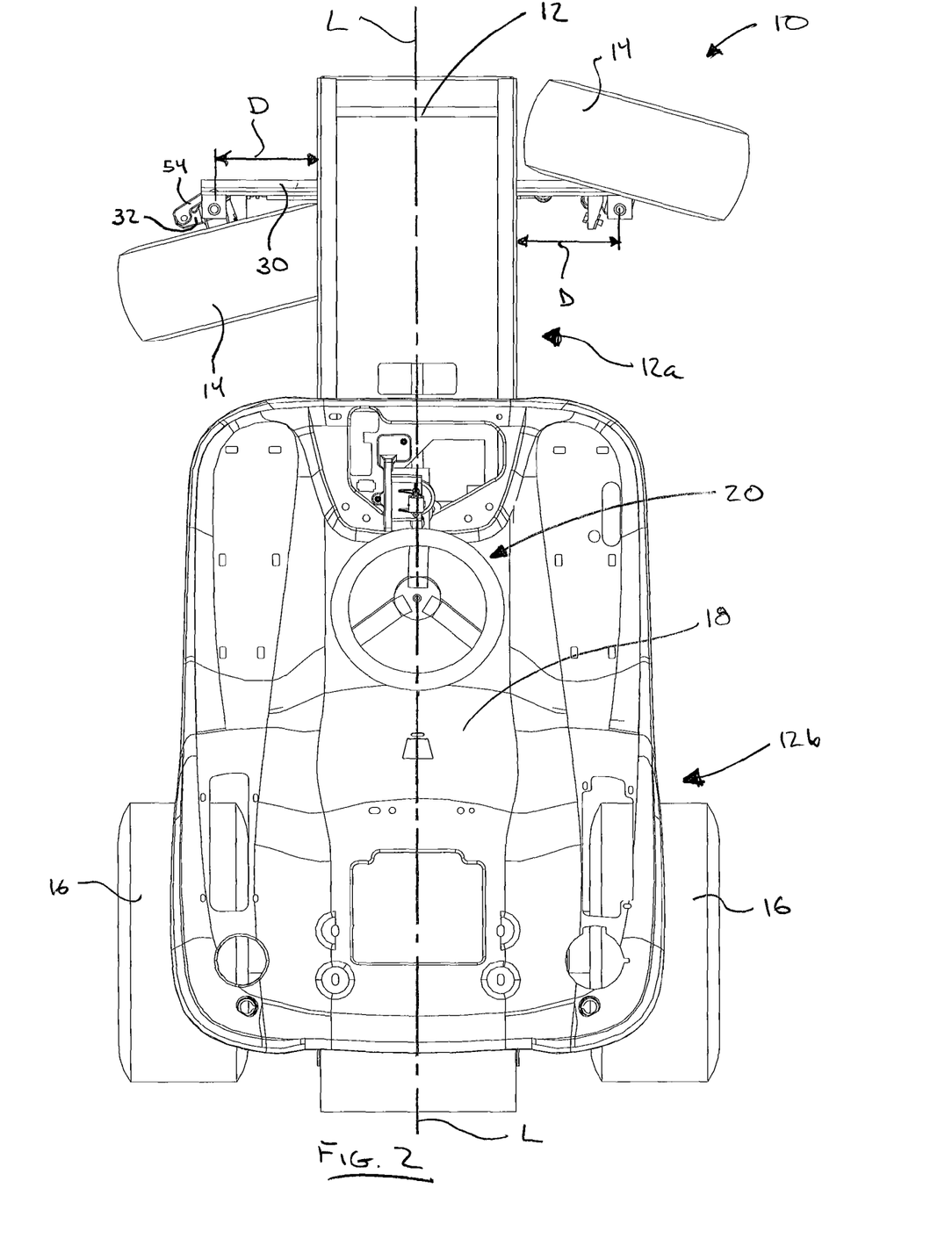
FIG. 2 is a top plan view of the riding lawn mower of FIG. 1.

Referring to FIGS. 1 and 2, illustrated therein is a vehicle 10, for example a riding lawn mower. The vehicle 10 generally includes a vehicle frame 12 and wheels 14, 16 for supporting the vehicle frame 10. The vehicle 10 also includes a seating area 18 for a user to sit in, and a steering system 20 for operating a set of steerable wheels.

As shown the vehicle 10 may be a riding lawnmower for cutting grass, and in particular, an electric riding lawnmower. In other embodiments, the vehicle 10 may be a riding snow blower, a riding lawn tractor, or another small vehicle.

The vehicle frame 12 extends along a longitudinal axis L. Various components may be carried or supported by the vehicle frame 10, such as one or more motors, transmissions or gearboxes, shock absorbers, mowing equipment such as cutting blades or knives, and so on.

As shown, a set of front wheels 14 supports a front portion 12a of the vehicle frame 10 and a set of rear wheels supports a rear portion 12b of the vehicle frame 10. In the illustrated embodiment, the front wheels 14 are steerable wheels operated by the steering system 20, and the rear wheels 16 are driven wheels operated by a drive system (not shown). While the steering system 20 of the illustrated embodiment is configured to steer the front wheels 14, in some embodiments the steering system 20 may operate other steerable wheels, for example the rear wheels 16, or both the front and rear wheels 14 and 16 (e.g. so as to provide four-wheel steering).

In some embodiments, the drive system may include individual electric hub motors attached to each rear wheel 16. In other embodiments, the drive system may have other configurations, such as a gasoline engine or electric motor that provides power to each driven wheel via a drive train. In some embodiments the drive system may drive other driven wheels, such as the front wheels 14 (e.g. so as to provide front-wheel drive), or both the front and rear wheels 14 and 16 (e.g. so as to provide all-wheel-drive).

Referring now to FIGS. 3-7, the steering system 20 will be described in greater detail.

As shown, the steering system 20 is configured to steer the front wheels 14, and includes a front wheel frame 30 pivotally coupled to the vehicle frame 12 for permitting the front wheel frame 30 to roll relative to the vehicle frame 12, a set of steering knuckles 32 for coupling the front wheels 14 to the front wheel frame 30, a rack and pinion steering mechanism 34 for pivoting the steering knuckles 32 so as to steer the front wheels 14, and a steering wheel 36 and a steering column 38 adapted so that a user can operate the rack and pinion steering mechanism 34.

Figure 3:
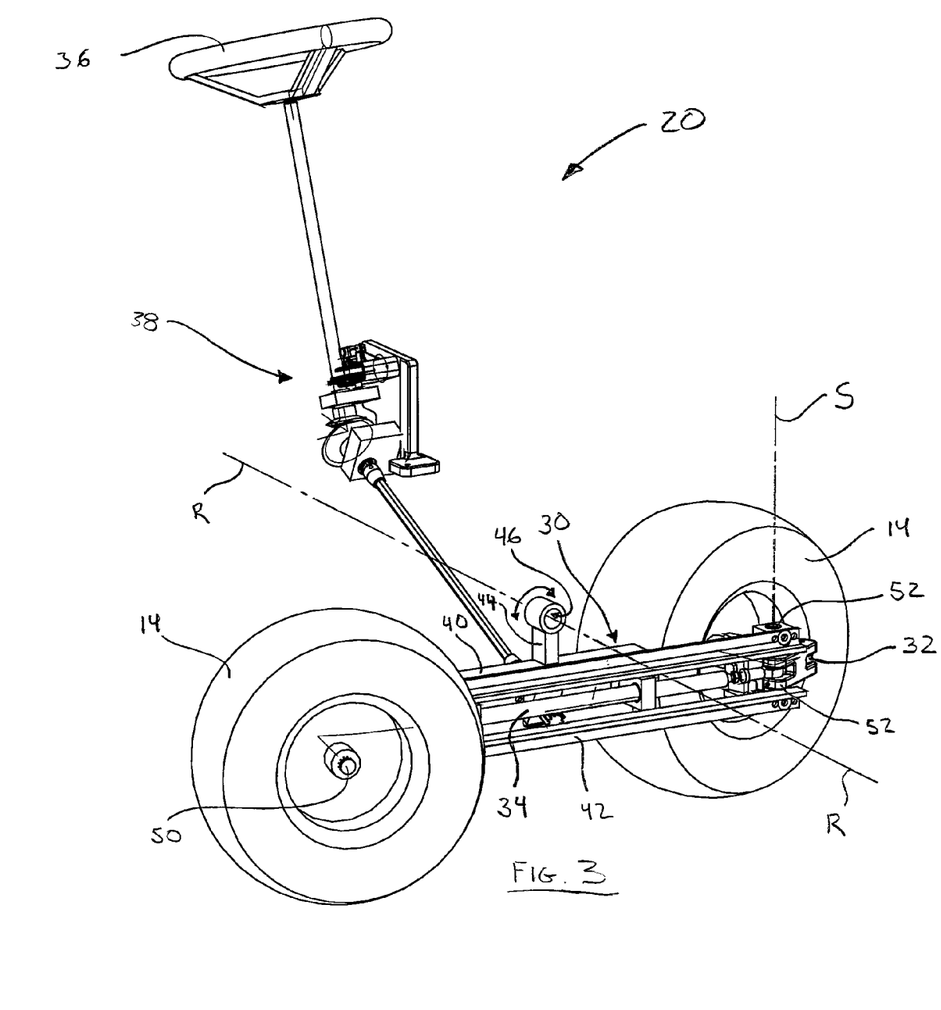
FIG. 3 is a perspective view of a steering system of the riding lawn mower of FIG. 1.

The front wheel frame 30 includes spaced apart upper and lower wheel frame members 40, 42. The upper and lower wheel frame members 40, 42 extend transversely across the vehicle 10 and may be made from angle bar, or another suitable framing material such as tube steel, aluminium profile, and so on. While the upper and lower members 40, 42 are shown as separate parts, in some embodiments, the upper and lower members 40, 42 may be formed as a single component with a space or opening therebetween.

As indicated above, the front wheel frame 30 is pivotally coupled to the vehicle frame 12 about a longitudinally extending roll axis R, thus permitting the front wheel frame 30 to roll relative to the vehicle frame 12. This can provide a form of suspension and may improve vehicle stability or control, particularly while traveling on uneven terrain. This improved stability is particularly useful for riding lawn mowers that often travel on uneven lawns.

In order to couple the front wheel frame 30 to the vehicle frame 12 about the roll axis R, the front wheel frame 30 includes a pivot member 44 extending upwardly from the upper wheel frame member 40. The pivot member may be a mounting point for pivotally coupling the wheel frame 30 to the vehicle frame 12. For example, the pivot member 44 may include an aperture 46 for receiving a corresponding pin (not shown) so as to pivotally couple the front wheel frame 30 to the vehicle frame 12. The aperture 46 and the corresponding pin generally cooperate to define the roll axis R.

Figure 4:
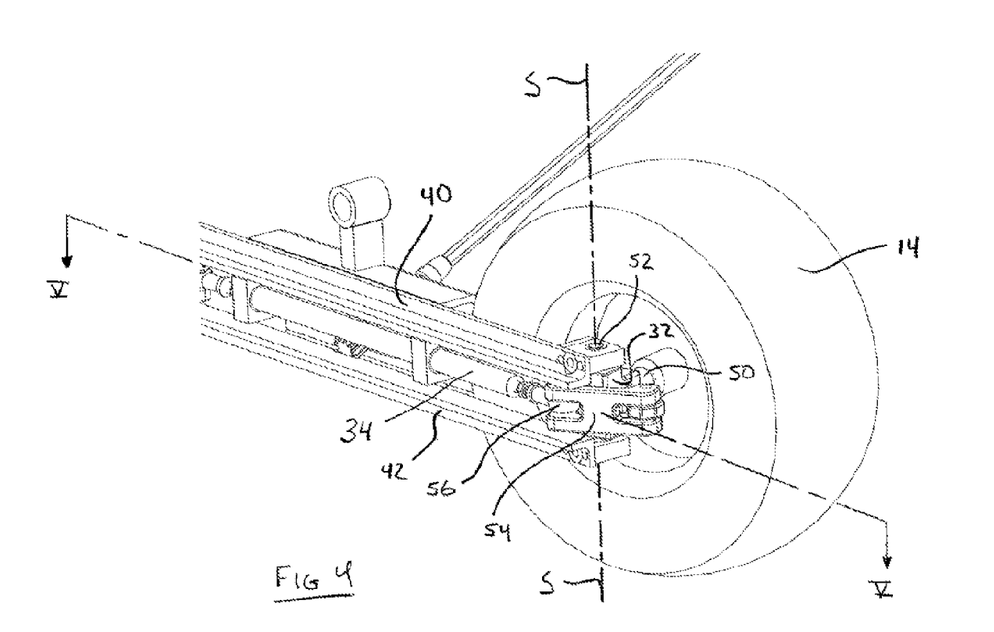
FIG. 4 is an enlarged perspective view of a portion of the steering system of FIG. 3.
Figure 5:
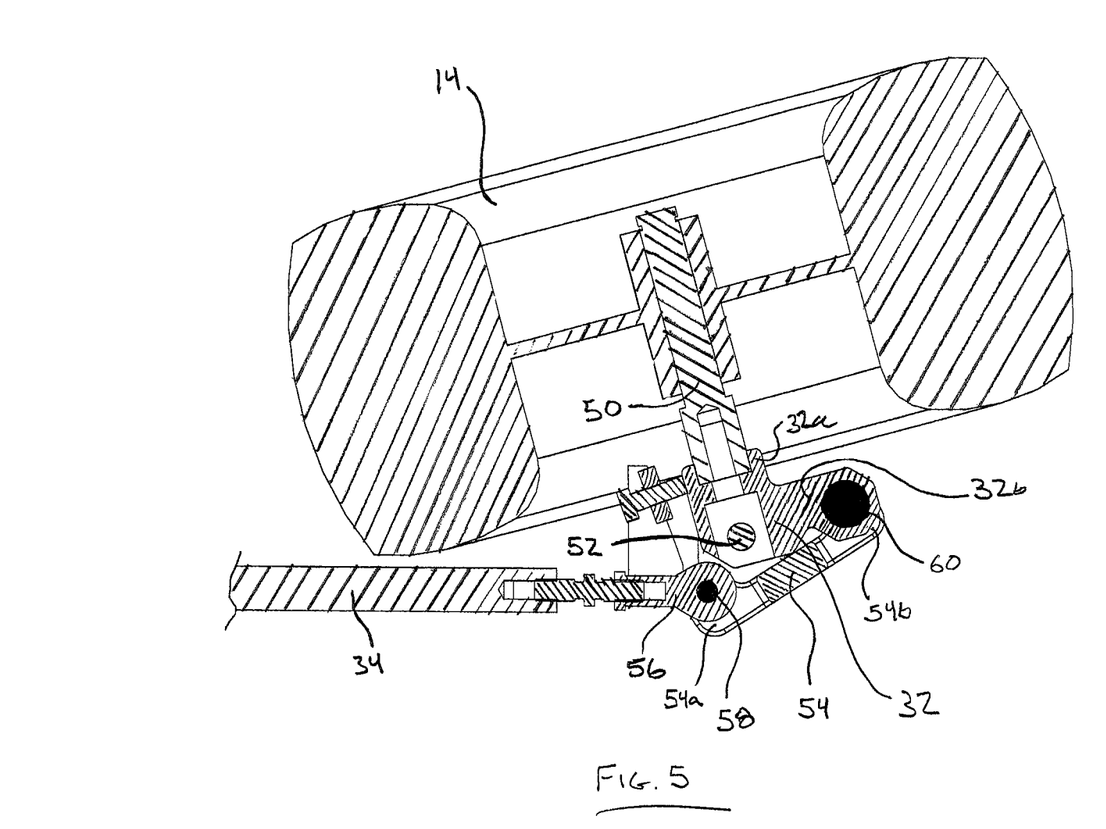
FIG. 5 is a cross-sectional view of the portion of the steering system of FIG. 4 along the line V-V.

As shown, the steering knuckles 32 are pivotally coupled to opposing sides of the front wheel frame 30. The steering knuckles 32 rotatably support the front wheels 14, for example, on corresponding axles 50, as shown in FIGS. 3, 4 and 5. Furthermore, each steering knuckle 32 is adapted for pivotal movement about a respective steering axis S (which may be generally vertical), which allows the front wheels 14 to be steered. For example, each steering knuckle 32 may be pivotally coupled to the front wheel frame 30 using a king pin 52, which defines the steering axis S.

Referring now to FIGS. 4 and 5, each steering knuckle 32 is pivotally coupled between the upper and lower wheel frame members 40, 42. More particularly, the steering knuckles 32 are straddle mounted between the upper and lower wheel frame members 40, 42. Straddle mounting the steering knuckles 32 between the upper and lower frame wheel member 40, 42 tends to provide a strong joint for supporting the wheels 14 while still permitting pivotal movement of the steering knuckles 32 so as to enable steering.

As shown in FIG. 5, each steering knuckle 32 may be formed as a bell crank having two arms 32a, 32b that extend outwardly from the king pin 52 generally orthogonal to each other. As shown, one arm 32a is coupled to the wheel 14 via the axle 50. The other arm 32b is coupled to the rack and pinion steering mechanism 34 via a link arm 54. In particular, the link arm 54 has two ends 54a, 54b. The first end 54b of the link arm 54 is pivotally coupled to a rod end 56 of the rack and pinion steering mechanism 34 via a first pin 58, and the second end 54b of the link arm 54 is pivotally coupled to the first arm of the steering knuckle 32 using a second pin 60.

While the illustrated embodiment includes the link arm 56 and rod end 58, in some embodiments, the rack and pinion steering mechanism 34 may be directly coupled to the steering knuckles 32, or may be coupled using other indirect configurations.

In some embodiments, the steering knuckles 32 may be adapted to provide a zero turning radius. For example, the steering knuckles 32 may be sized and shaped to fit between the upper and lower members 40, 42 such that the steering knuckles 32 can pivot freely therebetween. In such embodiments, the limiting factor for the turning radius may be the wheel clearance between the wheels 14 and the vehicle frame 12 and not the freedom of movement of the steering knuckles 32.

Accordingly, in some embodiments, the vehicle 10 may be adapted to have sufficient wheel clearance so as to provide a zero turning radius. For example, the opposing sides of the front wheel frame 30 may be configured to extend transversely outwardly beyond the front portion 12a of the vehicle frame 12 by an overhang distance D as shown in FIG. 2.

The overhang distance D may be selected to provide the vehicle 10 with a zero turning radius. For example, the overhang distance D may be about the same size as the radius of the wheel 14, or even larger.

Figure 6:
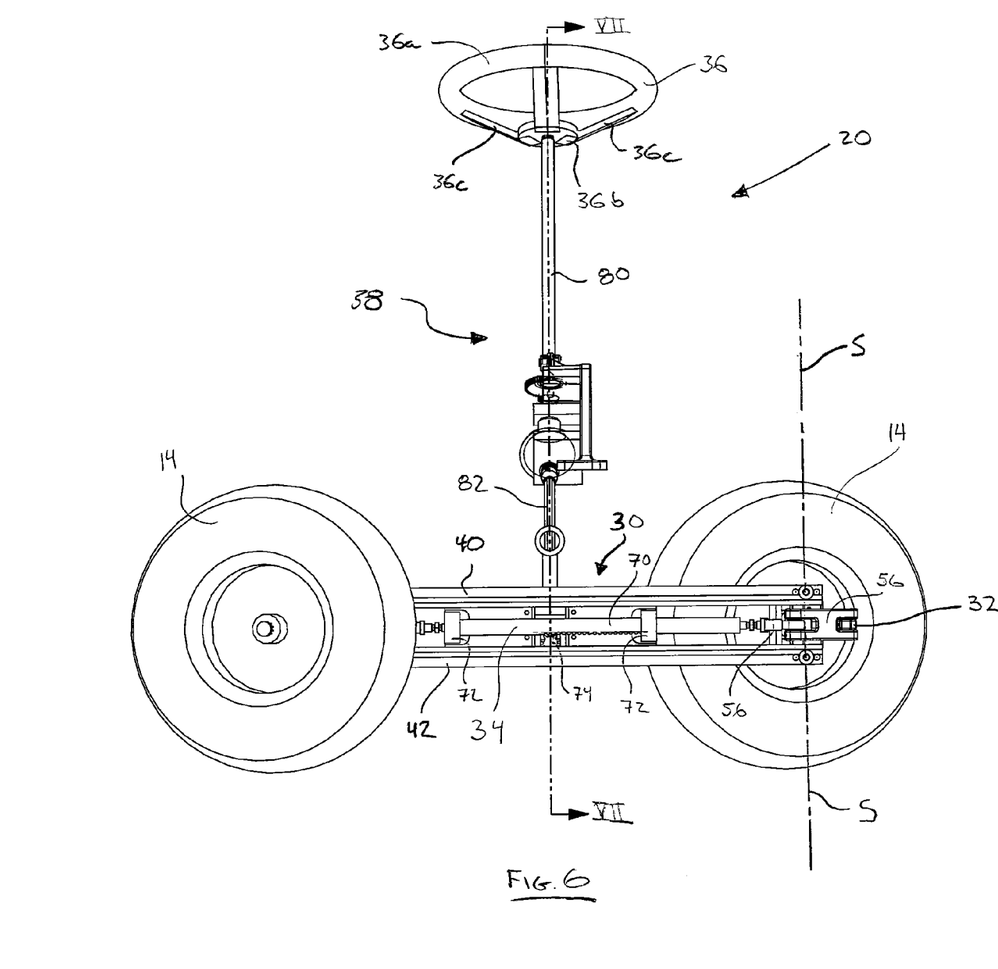
FIG. 6 is a front elevation view of the steering system of FIG. 3.
Figure 7:
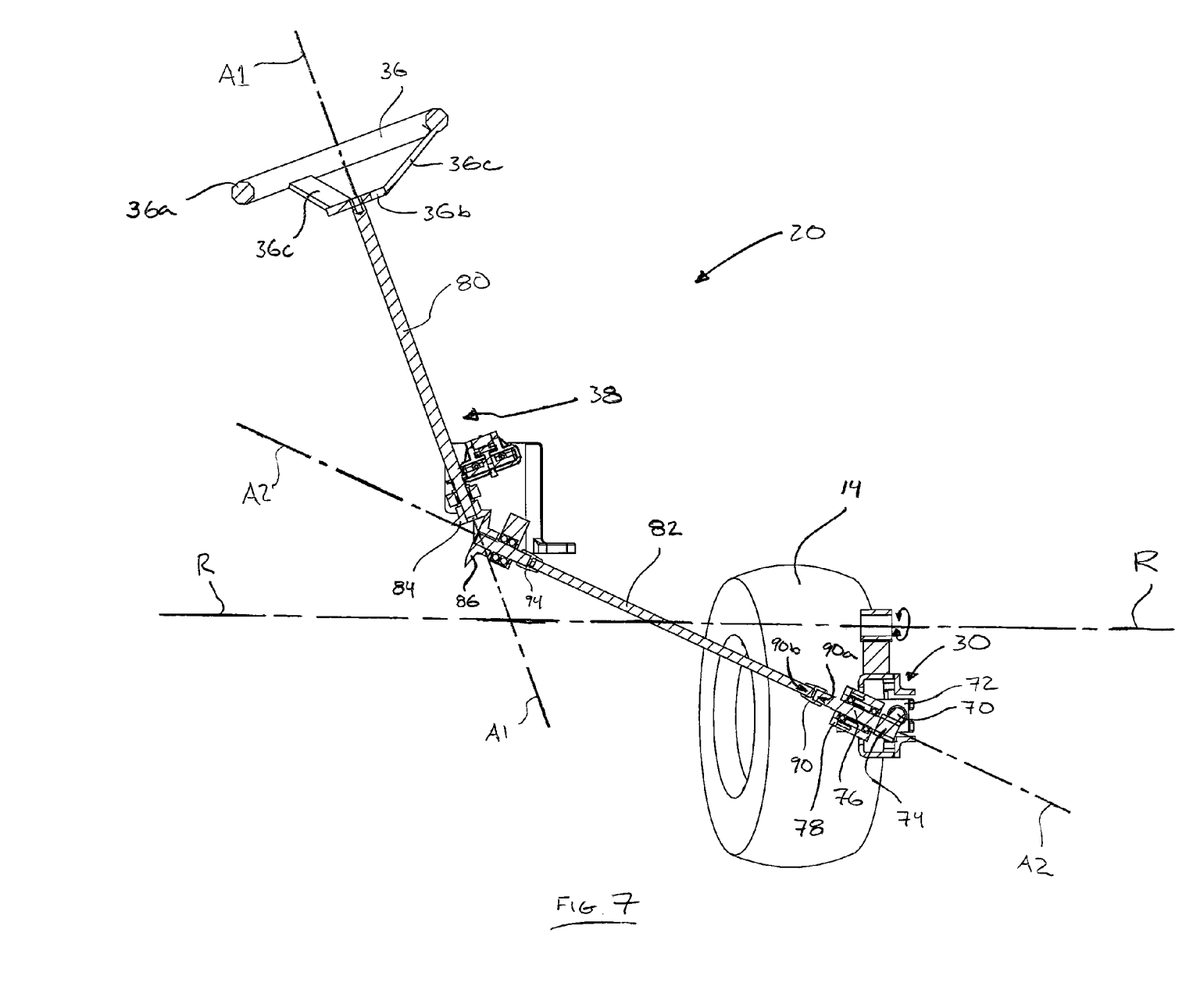
FIG. 7 is a cross-sectional view of the steering system of FIG. 6 along the line VII-VII.

Referring now to FIGS. 6 and 7, as shown the rack and pinion steering mechanism 34 is coupled to the left and right steering knuckles 32 and is adapted to pivot the steering knuckles 32 about their respective steering axes S.

The rack and pinion steering mechanism 34 includes a rack 70 supported between the upper and lower wheel frame members 40, 42. More particularly, the rack 70 is slidably supported by a set of bushings 72 for transverse movement back and forth. The rack 70 extends between the left and right steering knuckles 32 and is coupled thereto, for example, via the rod ends 56 and the link arms 54 as described above.

The rack and pinion steering mechanism 34 also includes a pinion 74 coupled to a lower end of the steering column 38. The pinion 74 is positioned to engage the rack 70, and in particular, may have a toothed outer profile that engages a corresponding toothed section of the rack 70. Accordingly, pivotal movement of the steering column 38 rotates the pinion 74 so as to shift the rack 70 back and forth and thereby pivot the steering knuckles 32.

As shown in FIG. 7, the pinion 74 may be supported by the front wheel frame 30. For example, the pinion 74 may include a pin portion 76 rotatably supported within a bearing block 78 that is attached to the front wheel frame 30.

While the illustrated embodiment includes a rack and pinion steering mechanism 34, in some embodiments, the vehicle 10 may include other steering mechanisms, such as a recirculating ball steering mechanism, a worm and sector steering mechanism, a bell crank steering mechanism, and so on.

As described above, the steering wheel 36 and the steering column 38 cooperate to operate the rack and pinion steering mechanism 34.

Referring still to FIGS. 6 and 7, the steering wheel 36 as shown includes a circular ring member 36a connected to a central hub 36b via spokes 36c. The central hub 36a is coupled to an upper end of the steering column 38.

In some embodiments the steering wheel 36 may have other configurations such as an elliptical-shaped steering wheel, a hub with two D-shaped rings extending therefrom, a straight bar coupled to the steering column (e.g. similar to that of a bicycle), and so on.

As shown in FIGS. 6 and 7, the steering column 38 couples the steering wheel 36 to the rack and pinion steering mechanism 34, and in particular, to the pinion 74. The steering column 38 may include an upper shaft portion 90 coupled to the steering wheel 36, a lower shaft portion 92 coupled to the pinion 74, and a set of bevel gears 84 and 86 for coupling the upper shaft portion 80 to the lower shaft portion 82.

The upper shaft portion 80 extends along an upper shaft axis A1 and the lower shaft portion 82 extends along a lower shaft axis A2. Both the axes A1 and A2 are inclined relative to the rotational axis R (and the longitudinal axis L). Furthermore, the upper shaft axis A1 is inclined upwardly relative to the lower shaft axis A2. The use of bevel gears 84 and 86 generally accommodates the different angles of the upper and lower shaft portions 80 and 82.

In some embodiments, the upper and lower shaft portions 80, 82 may be coupled together using a device other than the bevel gears 84 and 86, such as a universal joint, an elastic coupling, and so on.

Furthermore, while the steering column 38 of the illustrated embodiment includes separate upper and lower shaft portions 80, 82, in some embodiments, the steering column 38 may include one or more shaft portions.

As shown, the lower shaft portion 82 includes socketed connections for coupling the lower shaft portion to respective rotatable components, namely, the bevel gear 86 and the pinion 74. In the illustrated embodiment, the socketed connections are provided by shaft couplers 90, 94 as will be described below.

Generally, the socketed connections are adapted to provide engagement between the lower shaft portion 82 and the respective rotatable components (e.g. the bevel gear 86 and the pinion 74). This engagement allows transmission of rotational movement about the lower shaft axis A2 from the bevel gear 86 to the lower shaft portion 82, and from the lower shaft portion 82 to the pinion 74.

The socketed connections are also adapted to permit axial movement of the lower shaft portion 82 along the lower shaft axis A2. More particularly, the socketed connections allow axial movement in response to the front wheel frame 30 rolling relative to the vehicle frame 12 about the roll axis R. Permitting this axial movement can help to isolate steering functions (e.g. rotation of the lower shaft portion 82 about the lower shaft axis A2) from suspension functions (e.g. roll of the wheel frame about the roll axis R). For example, if the socketed connections did not accommodate axial movement of the lower shaft portion 82, then rolling or swaying of the front wheel frame 30 relative to the vehicle frame 12 might cause unintentional turning, wheel skidding, and other dynamic steering errors.

As indicated above, the socketed connections may be provided by upper and lower shaft couplers 90, 94.

The lower shaft coupler 90 couples the pinion 74 to a lower end of the lower shaft 82. The lower shaft coupler 90 has two opposing ends. Each end has a corresponding socket 90a and 90b so as to provide two socketed connections. The lower socket 90a slidably receives the pin portion 76 of the pinion 74, which extends along the lower shaft axis A2. The upper socket 90b slidably receives the lower end of the lower shaft portion 82.

Both sockets 90a and 90b are adapted to provide engagement between the lower shaft portion 82 and the pinion 74 such that rotational movement of the lower shaft portion 82 about the lower shaft axis A2 operates the rack and pinion steering mechanism 34. For example, the sockets 90 and 90b may have hexagonal shaped cross-sections configured to radially engage corresponding hexagonal cross-sections of the lower shaft portion 82 and the pin portion 76 of the pinion 74. The corresponding hexagonal cross-sections tend to transmit rotation from the lower shaft portion 82 to the pinion 74.

In other embodiments, the sockets 90a and 90b may have other cross-sectional shapes, such as square, star-shaped, and so on that are shaped to engage corresponding cross-sections of the lower shaft portion 82 and the pin portion 76 of the pinion 74.

Both sockets 90a and 90b are also adapted to permit axial movement of the lower shaft portion 82 along the lower shaft axis A2 relative to the pinion 74, particularly, in response to the front wheel frame 30 rolling relative to the vehicle frame 12 about the roll axis R. In particular, the sockets 90a and 90b have cross-sections sized and shaped to slidably receive correspondingly shaped ends of the pin portion 76 and the lower shaft portion 82. For example, the sockets 90a and 90b may have hexagonal cross-sections shaped to receive corresponding hexagonally shaped ends of the pin portion 76 and the lower shaft portion 82 as described above.

While the lower shaft coupler 90 is shown as a separate component, in some embodiments, the lower shaft coupler 90 may be formed integrally with the lower shaft portion 82 or the pin portion 76 of the pinion 74. In such embodiments, there might be only one socketed connection.

The upper shaft coupler 94 couples the bevel gear 86 to an upper end of the lower shaft portion 82. The upper shaft coupler 94 may be similar to the lower shaft coupler 90. Furthermore, in some embodiments, the upper shaft coupler 94 may be formed integrally with one of the lower shaft portion 82 or the bevel gear 86. In such embodiments, there might be only one socketed connection.

In some embodiments, the steering system 20 may include only one of the shaft couplers 90 and 94. Furthermore, that shaft coupler may be integrally formed with one of the respective components (e.g. the lower shaft portion 82, the bevel gear 86, or the shaft portion 92 of the pinion 74) as described above.

While the above description provides examples of one or more apparatus, methods, or systems, it will be appreciated that other apparatus, methods, or systems may be within the scope of the present description as interpreted by one of skill in the art.

The invention claimed is:

1. A riding lawnmower comprising:
   (a) a vehicle frame extending along a longitudinal axis;
   (b) left and right rear wheels for supporting a rear portion of the vehicle frame;
   (c) left and right front wheels for supporting a front portion of the vehicle frame; and
   (d) a steering system for steering the front wheels, the steering system comprising:
      (i) a front wheel frame pivotally coupled to the vehicle frame about a longitudinally extending roll axis for permitting the front wheel frame to roll relative to the vehicle frame, the front wheel frame having spaced apart upper and lower wheel frame members;
      (ii) left and right steering knuckles pivotally coupled to opposing sides of the front wheel frame for rotatably supporting the front wheels, each steering knuckle being straddle mounted between the upper and lower wheel frame members and being adapted for pivotal movement about a respective steering axis;
      (iii) a rack and pinion steering mechanism coupled to the left and right steering knuckles for pivoting the steering knuckles about each respective steering axis;
      (iv) a steering wheel for operating the rack and pinion steering mechanism; and
      (v) a steering column for coupling the steering wheel to the rack and pinion steering mechanism, the steering column including at least one shaft portion extending along a shaft axis, the shaft portion having at least one socketed connection;
      (vi) wherein the socketed connection is adapted to provide engagement between the shaft portion and a rotatable component so as to transmit rotational movement about the shaft axis between the shaft portion and the rotatable component; and
      (vii) wherein the socketed connection is adapted to permit axial movement of the shaft portion along the shaft axis in response to the front wheel frame rolling relative to the vehicle frame about the roll axis.

2. The riding lawn mower of claim 1, wherein the shaft portion is a lower shaft portion extending along a lower shaft axis, and wherein the rotatable component is a pinion of the rack and pinion steering mechanism.

3. The riding lawn mower of claim 2, further comprising a lower shaft coupler for coupling the lower shaft portion to the pinion, and wherein the lower shaft coupler provides the socketed connected between the lower shaft portion and the pinion.

4. The riding lawn mower of claim 3, wherein the lower shaft coupler has an upper socket with a hexagonal cross-section configured to radially engage a corresponding hexagonal cross-section of the lower shaft portion.

5. The riding lawn mower of claim 2, further comprising:
   (a) an upper shaft portion extending along an upper shaft axis inclined upwardly relative to the lower shaft axis; and
   (b) an upper shaft coupler for coupling the upper shaft portion to the lower shaft portion, and wherein the upper shaft coupler provides the socketed connection between the upper shaft portion and the lower shaft portion.

6. The riding lawn mower of claim 1, wherein the rack and pinion steering mechanism comprises:
   (a) a rack supported between the upper and lower wheel frame members, the rack extending between the left and right steering knuckles and coupled thereto; and
   (b) a pinion coupled to the steering column and positioned to engage the rack such that rotational movement of the shaft portion about the shaft axis rotates the pinion so as to shift the rack back and forth and thereby pivot the steering knuckles.

7. The riding lawn mower of claim 1, wherein the front wheel frame comprises a pivot member extending upward from the upper wheel frame member for pivotally coupling the front wheel frame to the vehicle frame along the roll axis.

8. The riding lawn mower of claim 7, wherein the pivot member has an aperture for receiving a corresponding pin so as to pivotally couple the front wheel frame to the vehicle frame about the roll axis.

9. The riding lawn mower of claim 1, wherein the at least one shaft portion comprises:
   (a) an upper shaft portion coupled to the steering wheel, the upper shaft portion extending along an upper shaft axis; and
   (b) a lower shaft portion for coupling the upper shaft portion to the rack and pinion steering mechanism, the lower shaft portion extending along a lower shaft axis;
   (c) wherein the upper shaft axis is inclined upwardly relative to the lower shaft axis.

10. The riding lawn mower of claim 9, wherein the steering system further comprises a set of bevel gears for coupling the upper shaft portion to the lower shaft portion.

11. The riding lawn mower of claim 1, wherein the steering system is adapted to provide a zero turning radius.

12. The riding lawn mower of claim 11, wherein each steering knuckle is sized and shaped to fit between the upper and lower wheel frame members such that the steering knuckle can pivot freely therebetween so as to provide the zero turning radius.

13. The riding lawn mower of claim 11, wherein the opposing sides of the front wheel frame extend transversely outward beyond the front portion of the vehicle frame by an overhang distance.

14. The riding lawn mower of claim 13, wherein the overhang distance is at least as large as about the radius of the front wheels.

15. The riding lawn mower of claim 1, further comprising left and right link arms for coupling the rack and pinion steering mechanism to the steering knuckles.

16. A steering system for a vehicle, the steering system comprising:
   (a) a wheel frame configured to be pivotally coupled to a vehicle frame about a longitudinally extending roll axis for permitting the wheel frame to roll relative to the vehicle frame, the wheel frame having spaced apart upper and lower wheel frame members;
   (b) left and right steering knuckles pivotally coupled to opposing sides of the wheel frame for rotatably supporting wheels, each steering knuckle being straddle mounted between the upper and lower wheel frame members for pivotal movement about a respective steering axis;
   (c) a steering mechanism coupled to the left and right steering knuckles for pivoting the steering knuckles about each respective steering axis;
   (d) a steering wheel for operating the steering mechanism; and
   (e) a steering column for coupling the steering wheel to the steering mechanism, the steering column including at least one shaft portion extending along a shaft axis, the shaft portion having at least one socketed connection;
   (f) wherein the socketed connection is adapted to provide engagement between the shaft portion and a rotatable component so as to transmit rotational movement about the shaft axis therebetween; and
   (g) wherein the socketed connection is adapted to permit axial movement of the shaft portion along the shaft axis in response to the wheel frame rolling relative to the vehicle frame about the roll axis.

17. The steering system of claim 16, wherein the shaft portion comprises a lower shaft portion coupled to the steering mechanism and extending along a lower shaft axis, and an upper shaft portion for coupling the steering wheel and the lower shaft portion, the upper shaft portion extending along an upper shaft axis that is inclined upwardly relative to the lower shaft axis.

18. A vehicle comprising:
   (a) a vehicle frame;
   (b) first and second wheels for supporting at least a portion of the vehicle frame; and
   (c) a steering system for steering the first and second wheels, the steering system comprising:
      (i) a wheel frame pivotally coupled to the vehicle frame and adapted to roll relative to the vehicle frame about a longitudinally extending roll axis;
      (ii) first and second steering knuckles pivotally coupled to the wheel frame for rotatably supporting the first and second wheels, respectively, each steering knuckle adapted for pivotal movement about a respective steering axis;
      (iii) a steering mechanism coupled to the first and second steering knuckles for pivoting each of the first and second steering knuckles about the respective steering axis; and
      (iv) a steering column coupled to the steering mechanism, the steering column comprising at least one shaft portion extending along a shaft axis, the at least one shaft portion comprising at least one socketed connection,
   wherein the socketed connection is adapted to provide engagement between the at least one shaft portion and the steering mechanism so as to transmit rotational movement about the shaft axis between the at least one shaft portion and the steering mechanism, and
   wherein the socketed connection is adapted to permit axial movement of the at least one shaft portion along the shaft axis in response to the wheel frame rolling relative to the vehicle frame about the roll axis.

19. The vehicle of claim 18, wherein the at least one shaft portion comprises a lower shaft portion, the steering mechanism comprises a pinion, and the at least one socketed connection comprises a lower shaft coupler for coupling the lower shaft portion to the pinion.

20. The vehicle of claim 19, wherein the at least one shaft portion comprises an upper shaft portion, the at least one socketed connection comprises an upper shaft coupler for coupling the upper shaft portion to the lower shaft portion, the lower shaft portion extends along a lower shaft axis, and the upper shaft portion extends along an upper shaft axis that is inclined upwardly relative to the lower shaft axis.

* * * * *